:::::::::::::::::::::::::::::::::::::::::::::::::::::::::::::::::::::::::::::::::::::::::::::::::::::::::::::::::::::::::::::::::::::::::::::::::::::::::::::

2,878,518

PROCESS FOR PREPARING FERROSILICON PARTICLES

Helmuth Klee, Knapsack, near Koln, Germany, assignor to Knapsack-Griesheim Aktiengesellschaft, Knapsack, near Koln, Germany, a corporation of Germany No Drawing. Application March 6, 1956
Serial No. 569,686

Claims priority, application Germany March 12, 1955

7 Claims. (Cl. 18—47.3)

The present invention relates to a material consisting of ferrosilicon-containing particles, especially a material having a high content of particles of a round or even globular form and an especially smooth and uniform surface; and a process for preparing such material.

The material according to the present invention is particularly adapted for use in the preparation of fluids for gravity separation used in the dressing of ores and scrap metal. In this dressing, the sink-and-float process has gained special importance and makes use of separating fluids which contain, as a gravity substance, ferrosilicon powder containing 14–16 percent of silicon, the particle size of about 40–60 percent of the powder being in general less than 60 micron ($\mu$). The said process requires a fairly high specific gravity of the fluid, corresponding to a high concentration of ferrosilicon powder but, on the other hand, the fluid must still behave like a liquid in spite of the high content of ferrosilicon powder.

The present invention provides a material consisting in its major part (for example by more than about 85 percent) of ferrosilicon-containing particles of an especially smooth and uniform surface and round to globular form; said particles contain ferrosilicon containing about 10 to about 25 percent of silicon and about 0.08 to about 0.5 percent of aluminum. In addition to these particles present to more than about 85% and having an especially smooth and uniform surface and round to globular form, the material substantially contains particles of approximately the same composition but of a rough surface having edges and points. The higher the aluminum content (within the above mentioned range of about 0.08 to about 0.5 percent), the higher is, in the main, the portion of particles of a particularly smooth surface and round to globular form. In general, this portion increases to about 95 percent and in special cases it can be raised to 100 percent.

The size of both kinds of particles is substantially the same, the diameter of the particles being between about $1\mu$ and about $100\mu$.

In addition to the above mentioned quantities of ferrosilicon and aluminium, the particles may also contain other metals. Said metals can be introduced into the ferrosilicon melt if, instead of metallic aluminum, a corresponding quantity of aluminum alloys, for example, those containing about 80 percent of aluminum and, furthermore, relatively small portions of at least one of the substances copper, silicon, manganese, chromium, magnesium and iron, is added to the melt in order to adjust the latter to the aluminum content required according to the invention.

Such a material according to the invention can be used with special advantage for the preparation of fluids for gravity separation. When using them in the sink-and-float process, corrosion and decomposition are considerably reduced, so that they are practically insignificant due to the particularly smooth surface of most of the particles. Furthermore, owing to the particularly smooth and uniform surface and round form of the particles, the losses in powder caused by the adherence of the latter to ore or scrap metal are very small, contrary to what is the case with the separating fluids obtained with the use of ferrosilicon powder prepared by the conventional methods.

With the material according to the present invention fluids for gravity separation can be obtained having a higher specific gravity than those containing ferrosilicon prepared in known manner, for example by grinding ferrosilicon of 15 percent strength, the particles of which possess surfaces showing edges and points. With the use of ferrosilicon powder obtained by grinding and containing 15 percent of silicon, fluids having a specific gravity of at most about 3.2 can be obtained. The ferrosilicon material according to the invention enables fluids having a specific gravity of 3.45 or, if a considerable portion of the particles is of globular form, of 3.9, to be obtained. Furthermore, due to the smooth surface of the particles, the viscosity of the fluid is considerably reduced, while the content of gravity substance is the same.

It is a further object of the invention that the material consisting of particles containing ferrosilicon can be obtained with special advantage by spraying a melt of ferrosilicon containing about 10 to about 25 percent of silicon, the aluminum content of the melt being between about 0.08 and about 0.5 percent, preferably between 0.1 and 0.3 percent.

The melt can be sprayed by means of gaseous or vaporous media such as water vapour or gases, suitably water vapour at high pressure of about 6 to about 13 atmospheres. Gases at high pressure such as nitrogen, air, etc., of about 6 to about 13 atmospheres may likewise be used.

During spraying, the temperature of the melt may be within the range of about 1200 and about 1600° C., within this range the temperature of the melt prevailing during spraying has no essential influence upon the form of the grains formed.

It is of special importance that the aluminum content of the melt is within the range indicated above. When the aluminum concentration of the melt is considerably lower or higher than the above-mentioned range of 0.08 to 0.5 percent, a ferrosilicon material is obtained which does not contain a sufficient portion of grains of a round form and smooth surface but whose particles show edges and points so that the material is not suited for the preparation of separating fluids.

When the process of the invention is carried out with a melt containing more than 0.5 percent of aluminium, a quantity of silicon dioxide, for example in the form of quartzite, quartz pebbles, quartz, gravel, quartz sand or silicates rich in silicon dioxide, is added to the melt so that the aluminum content of the latter is reduced to between about 0.08 and 0.5 percent, and the melt is then sprayed as indicated above. As such melts with an aluminium content of more than 0.5 percent there generally come into consideration those containing up to about 5 percent of aluminum.

When a melt containing less than 0.08 percent of aluminium is used, aluminum, for example in the form of metallic aluminum or aluminum alloys, is added to the melt in such a quantity that the aluminum content of the melt is increased to about 0.08 to 0.5 percent, and the melt is then sprayed in the above-mentioned manner. As aluminum alloys there can be used, for example, those containing about 80 percent of aluminum and furthermore additions of at least one of the substances copper, silicon, manganese, chromium, magnesium and iron.

The melt can also be adjusted to the aluminium content required according to the invention by first introducing silicon dioxide, for example in the form of quartzite, quartz pebbles, quartz, gravel, quartz sand or silicates rich in silicon dioxide, and thus removing completely the aluminium present in the melt and then adding aluminium to the melt in the form of metallic aluminium or aluminium alloys in such quantities that the aluminium content of the melt amounts to 0.08 to 0.5 percent.

It may be of advantage for operative reasons, in any case first to remove the aluminium from the melt, regardless of whether the aluminium content is above 0.5 percent or within the range of 0.08 to 0.5 percent or below 0.08 percent. Subsequently the melt is adjusted to the desired aluminium content of between about 0.08 and about 0.5 percent by addition of appropriate quantities of aluminium metal or aluminium alloys, for example of the kind indicated above.

A priori the aluminium content of the ferrosilicon melt is not, in most cases, between 0.08 and 0.5 percent but, owing to the method of preparing the melt, lower or higher. This may be due to the aluminium content of the starting materials or to other factors such as furnace lining, melting additions, slag or the temperature of the melt. When, for example, a furnace lining containing silicic acid is used, the low aluminium content of the melt is reduced by oxidation so that the aluminium content of the melt is too low for carrying out the process of the invention. The aluminium content of the starting materials can vary within wide limits. When, for example, commercial ferrosilicon containing 25, 45 or 75 percent of silicon is used, the aluminium content is between 0.2 and 5 percent. When, however, the ferrosilicon required for gravity separation and containing 15 percent of silicon is prepared in an electric furnace directly from coal, quartz and iron turnings (iron borings), it is necessary to start from crude substances which are poor in aluminium and therefore expensive in order to obtain the aluminium content according to the invention without application of further measures.

As ferrosilicon melt for the process of the present invention there can also be used the ferrosilicon obtained as by-product in the preparation of carbide, which ferrosilicon contains 15 to 20 percent of silicon and 0.5 to 5 percent of aluminium and must therefore be adjusted in the manner described above to an aluminium content of 0.08 to 0.5 percent.

In order to adjust melts with too high an aluminium content to the aluminium content to be used according to the invention, all the aluminium contained in the melt can be first removed from the melt by adding, for example, silicic acid, and the amount of aluminium according to the invention can then be introduced into the melt, in the form of aluminium metal or aluminium alloys, after removal of the slag and shortly before spraying from the melt. It is, however, also possible to use a furnace lining consisting of stones containing primarily silicic acid. In this case the addition of silicic acid can be dispensed with. When the melt already contains more aluminium than is required according to the invention, it is of course also possible to add only such a quantity of silicic acid as is necessary—taking into consideration a possible melting loss—for obtaining the required aluminium concentration. In case the quantity of aluminium present in the melt is too small, one can proceed accordingly.

The following examples serve to illustrate the invention but they are not intended to limit it thereto.

Example 1

In an electric furnace lined with coal and corundum, 300 kilograms of iron turnings or iron scrap and 150 kilograms of ferrosilicon having a silicon content of 45 percent and an aluminium content of about 1.5 percent are melted with quartz pebbles, quartzite, quartz or siliceous grit in a quantity corresponding to 5 kilograms of silicon dioxide. The melting temperature is about 1350° C. After a melting time of about 1 hour during which occluded gas escapes, about 1 kilogram of aluminium is added to the melt by means of water vapour of 9.5 atmospheres shortly before spraying from the melt. After this procedure the aluminium content amounts to about 0.2 percent. A ferrosilicon material is obtained, 90 percent of which, calculated upon the weight of the ferrosilicon material, consists of grains of a rounded form and a smooth surface. The material can be used with great advantage for fluids for gravity separation. The temperature at which spraying is conducted may vary from about 1200° C. to about 1600° C. since within this range the temperature has no significant influence upon the form of the grain.

If no aluminium is added shortly before spraying from the melt, the aluminium content of the melt is only 0.06 percent, i.e. outside the range necessary for carrying out the process of the invention. A melt of such a low aluminium content yields a ferrosilicon material having almost no grains of a smooth surface.

Example 2

In an electric furnace lined with coal and corundum, 150 kilograms of iron turnings or iron scrap and 300 kilograms of ferrosilicon containing about 25 percent of silicon and about 0.9 percent of aluminium are melted with quartz pebbles, quartzite, quartz or siliceous grit in a quantity corresponding to 3 kilograms of silicon dioxide. The melting temperature amounts to about 1400° C. The melting time is about 1 hour. The melt is subsequently sprayed by means of water vapour of 10.5 atmospheres. Such a quantity of $SiO_2$ is added that the aluminium content of the melt amounts to 0.2 percent and is thus within the limits according to the invention. A ferrosilicon material is obtained, 95 percent of which, calculated upon the weight of the ferrosilicon material, consists of grains of a rounded form and smooth surface. The material can be used with great advantage for fluids for gravity separation. The temperature at which spraying is conducted may vary between about 1200° C. and about 1600° C. since within this range the temperature has no essential influence upon the form of the grain.

Example 3

In an electric furnace provided with a lining containing quartz or silicic acid, 350 kilograms of ferrosilicon prepared in a carbide furnace and containing 19 percent of silicon and 2 percent of aluminium are melted with 80 kilograms of iron scrap or iron turnings. The melting temperature amounts to about 1500° C. After a melting time of about 1 hour, the slag formed is removed. 850 grams of aluminium or an aluminium alloy containing this quantity of aluminium are then introduced into the melt and the latter is immediately thereafter sprayed by means of nitrogen at 8 atmospheres. A ferrosilicon material is obtained, 90 percent of which, calculated upon the weight of the ferrosilicon, consists of grains of a rounded form and smooth surface. The material can be used with great advantage for fluids for gravity separation. The temperature at which spraying is carried out may vary between about 1200° C. and about 1600° C. since within this range the temperature has no essential influence upon the form of the grain.

I claim:

1. The process of preparing a material consisting of ferrosilicon-containing particles, more than about 85 percent of which is of a rounded to globular form and a smooth and uniform surface, which comprises adding to a ferrosilicon melt, containing about 10 percent to about 25 percent of silicon and more than 0.5 percent of aluminum, at least one substance containing $SiO_2$ selected from the group consisting of quartzite, quartz pebbles, quartz, gravel, quartz sand and silicates rich in $SiO_2$ in an amount so as to diminish the content in aluminum of the melt to a content ranging between about 0.5 percent and about 0.08 percent, and then spraying the melt so obtained.

2. The process of preparing a material consisting of ferrosilicon-containing particles, more than about 85 percent of which is of a rounded to globular form and a smooth and uniform surface, which comprises adding to a ferrosilicon melt, containing about 10 percent and about 25 percent of silicon and aluminum, at least one substance containing $SiO_2$ selected from the group consisting of quartzite, quartz pebbles, quartz, gravel, quartz sand and silicates rich in $SiO_2$, in such a quantity as completely to remove the aluminum content of the melt, then adding at least one substance selected from the group consisting of aluminum and aluminum alloys, in such a quantity as to adjust the aluminum content of the melt to about 0.08 percent to 0.5 percent, and then spraying the melt so obtained.

3. The process of preparing a material consisting of ferrosilicon-containing particles, more than about 85 percent of which is of a rounded to globular form and a smooth and uniform surface, which comprises adding to a ferrosilicon melt containing about 10 percent to about 25 percent of silicon and less than 0.08 percent of aluminum, at least one substance selected from the group consisting of aluminum and aluminum alloys, in such a quantity as to adjust the aluminum content of the melt to about 0.08 percent to about 0.5 percent, and then spraying the melt so obtained.

4. The process of preparing a material consisting of ferrosilicon-containing particles, more than about 85 percent of which is of a rounded to globular form having a smooth and uniform surface, said process comprising the steps of producing a ferrosilicon melt containing about 10 percent to about 25 percent of silicon and about 0.08 percent to about 0.5 percent of aluminum, and spraying said melt with the aid of a gaseous medium at a pressure of about 6 to 13 atmospheres, the temperature of the melt during spraying being within the range of about 1200 to about 1600° C.

5. The process of claim 4 wherein the gaseous medium is nitrogen.

6. The process of claim 4 wherein the gaseous medium is air.

7. The process of claim 4 wherein the gaseous medium is water vapor.

References Cited in the file of this patent

UNITED STATES PATENTS

| | | |
|---|---|---|
| 446,986 | Tilghman et al. | Feb. 24, 1891 |
| 1,601,898 | Wiley | Oct. 5, 1926 |
| 2,206,980 | Wade | July 9, 1940 |
| 2,208,974 | Haglund | July 23, 1940 |
| 2,701,775 | Brennan | Feb. 8, 1955 |
| 2,774,734 | Rodis et al. | Dec. 18, 1956 |

OTHER REFERENCES

Electric Furnace for Iron and Steel, page 185; edited by Stansfield; published in 1923 by the McGraw-Hill Book Co., New York.

UNITED STATES PATENT OFFICE

CERTIFICATE OF CORRECTION

Patent No. 2,878,518  March 24, 1959

Helmuth Klee

It is hereby certified that error appears in the printed specification of the above numbered patent requiring correction and that the said Letters Patent should read as corrected below.

Column 4, line 3, strike out "shortly before spraying from the melt" and insert the same after "melt" in line 2, same column.

Signed and sealed this 1st day of September 1959.

(SEAL)
Attest:

KARL H. AXLINE
Attesting Officer

ROBERT C. WATSON
Commissioner of Patents